(12) United States Patent
Benayoun et al.

(10) Patent No.: US 6,516,319 B1
(45) Date of Patent: Feb. 4, 2003

(54) PARALLELIZED PROCESSING DEVICE FOR PROCESSING SEARCH KEYS BASED UPON TREE STRUCTURE

(75) Inventors: Alain Benayoun, Cagnes sur Mer (FR); Jean-Francois Le Pennec, Nice (FR); Claude Pin, Nice (FR); Patrick Michel, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,493

(22) Filed: May 11, 2000

(30) Foreign Application Priority Data

May 20, 1999 (EP) .............................. 99480031

(51) Int. Cl.⁷ .............................................. G06F 17/30
(52) U.S. Cl. ............................ 707/100; 707/3; 370/392
(58) Field of Search ...................... 707/3, 100; 370/392

(56) References Cited

U.S. PATENT DOCUMENTS 5,664,184 A * 9/1997 Ferguson et al. .............. 707/3
6,041,053 A * 3/2000 Douceur et al. ............. 370/389
6,141,655 A * 10/2000 Johnson et al. ................. 707/2
6,292,795 B1 * 9/2001 Peters et al. .................... 707/3
6,334,125 B1 * 12/2001 Johnson et al. ................. 707/3

* cited by examiner

*Primary Examiner*—Greta L. Robinson
(74) *Attorney, Agent, or Firm*—David R. Irvin

(57) ABSTRACT

A device for parallel processing of subtrees within a binary tree for searching for the tree leaf matching a search key. The search is performed at each node by applying a recursive function associated with each node and whose parameters depend on the node for determining which branch, left or right, is to be taken in accordance with the search key. The device includes subtree register blocks for storing the recursive functions, processors for processing the recursive functions, a control unit that assigns one processor to the processing of the recursive functions contained in a block that sent the request to the control unit, and means for selecting subtrees included in the sequence of branches between the root and the leaf defined in accordance with the search key in response to the processing of blocks.

13 Claims, 8 Drawing Sheets

PARALLELIZED PROCESSING DEVICE FOR PROCESSING SEARCH KEYS BASED UPON TREE STRUCTURE

FIELD OF THE INVENTION

The present invention generally relates to systems for retrieving addresses from search keys by using tree structures and specifically relates to a parallel processing device for processing search keys based upon binary tree structures.

BACKGROUND

When routing data messages over a network that uses Internet Protocol (IP), sequential steps for determining routing addresses are frequently represented as a tree structure.

A tree is a homogeneous structure whose each element, called a node, contains information that enables selection of a link or a branch to another node. Each branch of the tree thus links a parent node to a child node. As a result, each node of the tree is both a parent node for lower branches and a child node for the top branch, except for the first node or root, which has no parent.

Among tree structures, the binary tree, in which each parent node has at most two child nodes, is used most often. A search binary tree is an ordered tree where each node is associated with a numeric key to which a function is applied for determining whether the right or the left branch is to be taken in order to go on searching. The position of nodes in the tree reflects an order relation between keys associated with them. Thus, from a node, a subtree determined by this order relation can always be defined, the number of all subtree keys corresponding to the left branch being lower than the number of keys corresponding to the right branch.

The function that applies to the key at each node is a more or less complex recursive function that may be a simple comparison, a multiple comparison or any other operation. A simple comparison may consist of determining the value of the following bit of the search key for choosing between the left branch (bit set to 0) and the right branch (bit set to 1), in which case the function to be applied to each node is the Boolean function AND between 1 and the search key bit value. On the other hand, a multiple comparison may consist of determining the value of the next K bits of the search key and selecting the left branch whenever the word made up of these K bits has a predetermined value, or selecting the right branch for any other values of the word.

When this kind of search based upon a tree structure is applied to routing within an IP network, the search key is made up of the destination address of the data packet to be sent. The router has a routing table, each entry of which comprises a prefix and a next hop. A prefix represents a group of addresses, and is made up of an IP address and a prefix length. The address lookup operation consists of searching the routing table for the longest prefix matching the packet destination address. The "next hop" field of this table entry defines how the packet is to be sent.

To implement this lookup operation, the routing table is arranged according to a tree structure in which each table prefix is represented by a leaf of the tree. Therefore, the operation consists of determining the sequence of nodes (or tree branches) to be taken from the root in order to end up at a leaf having the longest matching prefix when a destination address or a search key is known. Systems currently available for determining a routing address by using a tree structure have the disadvantage of requiring a large number of memory accesses, that depends directly on the size of the outing table. In the prior art, for example in U.S. patent applicaton Ser. No. 6,341,346 filed by the applicant, attempts were made to reduce the number of memory accesses in order to increase the system performance by processing the greatest number of bits at each node using instructions with specified parameters. The purpose of these methods is to reduce the number of nodes to be crossed when routing from the root to the leaf having the longest matching prefix. However, even if performance is increased by reducing the number of nodes, instructions must be applied sequentially, node after node, which may require considerable processing time in some cases.

SUMMARY OF THE INVENTION

Accordingly, the main purpose of the invention is to provide a searching device that is based upon a binary tree structure, which can perform look-ahead processing of predetermined subtrees within the primary tree.

The invention relates to a device for the parallel processing of subtrees within a binary tree, with the purpose of searching for the tree leaf matching a search key. Such a binary tree has a pyramidal structure starting from a root node and is made up of a plurality of nodes linked by branches in which each node is associated with a group of node keys. Each branch can have, at most, two child nodes linked to the parent node by means of a left branch and a right branch. The search process is performed at each node through the application of a recursive function associated with each node, whose parameters depend on the node for determining which branch, left or right, is to be taken in accordance with the search key. The device comprises a first plurality of subtree register blocks for storing the recursive functions associated with the nodes of a subtree within the binary tree, a second plurality of processors equal in number to at least to the first plurality for processing the recursive functions stored in the register blocks, a control unit that assigns one processor among the second plurality of processors to the processing of the recursive functions contained, among the first plurality of subtree register blocks, in a block that send the request to the control unit, and means for selecting subtrees included in the sequence of branches between the root and the leaf defined in accordance with the search key in response to the processing of blocks from the first plurality of subtree register blocks.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

In the following description, the device according to the invention is used for routing information over an IP network at each network router by applying the "longest matching prefix" search technique. However, the invention could be applied to any search that is performed from a search key and that can be represented as a binary tree.

Figure 1:
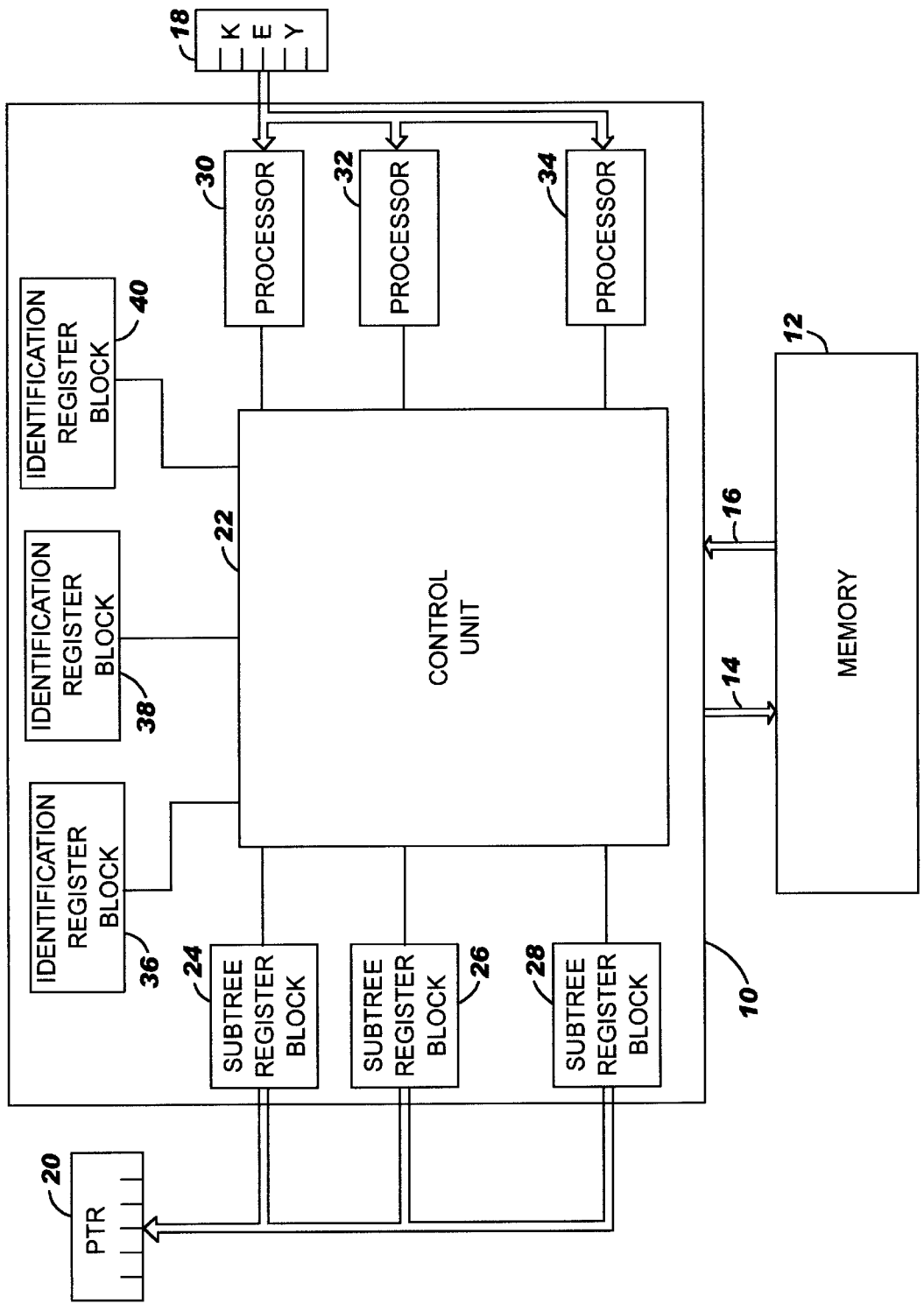
FIG. 1 is a block diagram representing a preferred embodiment of a parallel processing device for processing search keys based upon tree structures.

With reference to FIG. 1, the device according to the invention essentially consists of a programmable module 10 connected to a memory 12 through an address bus 14 and a data bus 16. The memory 12 is arranged as a table, each entry of which is associated with a tree node, and contains the recursive function or instruction to be applied to the node corresponding to each entry. The programmable module 10 receives a search key to be processed from a key register 18 and provides at the end of the processing a pointer that is loaded into a register PTR 20. This pointer enables an entity responsible for performing the routing to retrieve routing information. It is to be noted that KEY 18 and PTR 20 registers, although they are shown as being outside the module in FIG. 1, could be setup inside the programmable module 10 as well.

The programmable module 10 is mainly made up of a control unit 22 that could be a gate array or programmable gate array hardware state machine, or a microprocessor running the same finite-state sequence in the form of software instructions.

The tasks to be performed by the programmable module 10 are defined by subtree register blocks 24, 26 and 28 in which are loaded the instructions (recursive functions) to be applied to one or several subtree nodes. These tasks are performed in stand-alone mode by processors 30, 32, 34 which then return to the control unit the location of the tree branch to be used to go deeper in a subtree. Having several processors enables parallel execution of tasks.

Finally, the programmable module 10 also includes identification register blocks 36, 38 or 40 associated with each subtree being processed and having the function of determining the subtrees that are included in the sequence of the tree branches between the root and the leaf matching the search key. The sequence is determined according to the key in response to the processing of subtrees by programmable module processors.

Figure 2:
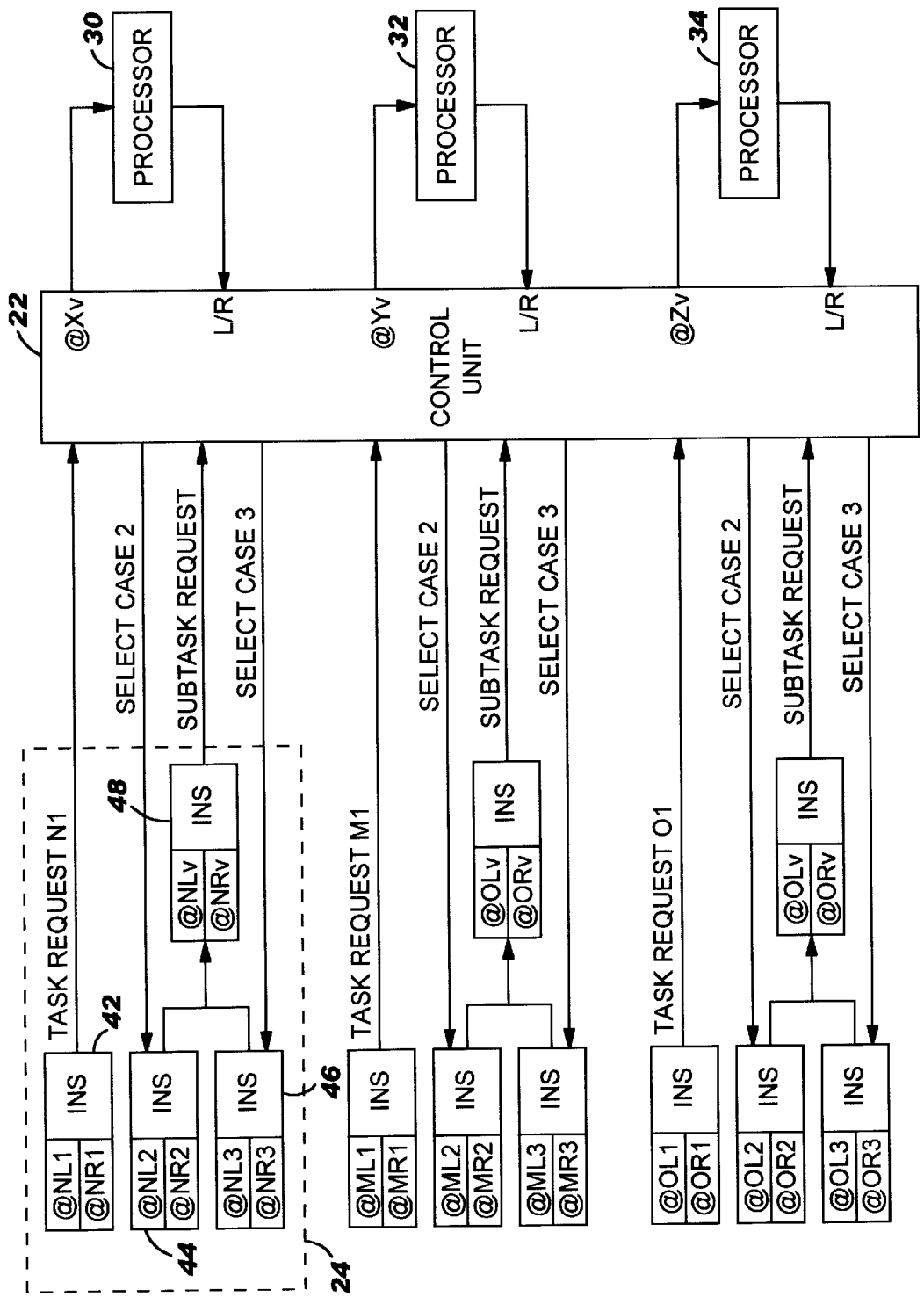
FIG. 2 schematically represents the essential features of the programmable module useful for implementing the device according to the invention.

The operation of the programmable module 10 is schematically shown in FIG. 2. The subtree register blocks are first loaded from memory 12. In the example shown in FIG. 2, the programmable module 10 has three subtree register blocks. Each of these blocks processes a subtree made up of branches that link the parent node to the child nodes which are in turn linked to the grandchild nodes. In this way, the subtree register block 24 is made up of three main registers 42, 44, and 46, and an intermediary register 48.

The instruction associated with the parent node is loaded into the main register 42 while the instructions associated with child nodes are respectively loaded into registers 44 and 46. It is to be noted that each such instruction is made up of the instruction (INS) processing data and of two fields containing the addresses in memory 12 of the two children. Thus, for the subtree N loaded into the subtree register block 24, the subtree 42 contains, in addition to the INS instruction itself, the address @NL1 if the branch selected from the parent 1 is the left branch, and the address @NR1 if the branch selected from the parent 1 is the right branch. Similarly, the registers 44 and 46 are respectively loaded by the instructions associated with the child nodes, that is containing the addresses @NL2 and @NR2 for the child 2 corresponding to the left branch and the addresses @NL3 and @NR3 for the child 3 corresponding to the right branch. Of course, the subtree register block might also contain the registers associated with the four branches that come from grandchildren, that is four additional registers. In the same way, a subtree register block could contain only one register associated with the parent node, but this structure would decrease the efficiency of the device. In the case shown in FIG. 2, the fields @NL1 and @NL2 could be removed as the child instructions are already present in the block, which would decrease the amount of data to be loaded from the memory 12. However, these fields are required when the processed subtree amounts to one node or when the node is the last one processed and points to the output pointer.

Once the instruction is loaded into the register 42, a task request is sent to the control unit 22 which selects one of the processors 30, 32, 34, if available, to perform the requested task according to the instruction loaded into the register. The address of the requesting register is @Xv, @Yv, @Zv depending on whether the selection respectively concerns the processors 30, 32 or 34, where X, Y, and Z refer to blocks N, M or O in FIG. 2, and v is set to 1, 2 or 3, depending on whether it is about the parent node 1 or one of the two child nodes 2 and 3. Assuming that the task is performed by the processor 30, the latter refers to either L or R depending on whether the processing of the instructions results in taking the left branch or the right branch. Then, the control unit 22 selects the register 44 corresponding to the left branch (select case 22) or the register 46 corresponding to the right branch (select case 3). In both cases, the main register content is loaded into the intermediary register 48 and a subtask request is sent to the control unit 22. The instruction present in the register 48 is then processed by the same processor 30 and the result (L or F) enables updating of identification registers, as described below.

As mentioned above, the register block 24 could also include registers for grandchild nodes, in which case the same processor would process the instructions corresponding to the parent node, child nodes and grandchild nodes. However, because of its optimal performance, the preferred embodiment is the one shown in FIG. 2 in which each subtree register block corresponds to one parent node and two child nodes.

The number of subtree register blocks as well as the number of processors depends on the size of the programmable module and on the expected performance. The number of subtree register blocks is not necessarily equal to the number of processors; rather, the number of subtree register blocks may be less than the number of processors so that the performance of the look-ahead feature of the device according to the invention is not penalized. It is to be noted that having more processors means having more concurrent tasks and, as a result, having more subtrees to process in parallel. In such a case, the number of active subtrees is greater than the number of subtree register blocks.

Figure 3:
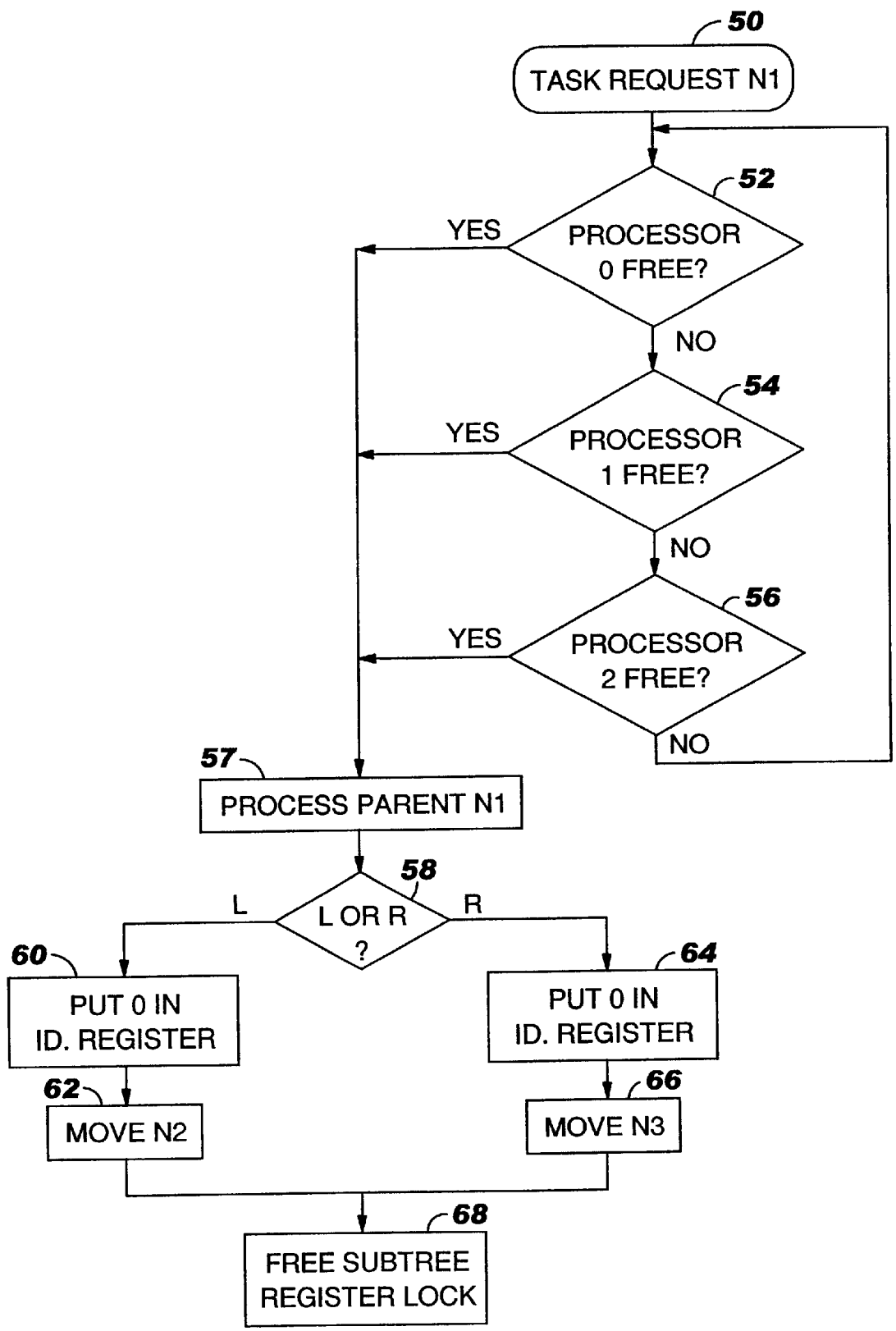
FIG. 3 is a flow chart giving the steps used to process the function associated with a parent node of a subtree.

The method implemented in the device according to the invention is now described with reference to FIGS. 3 to 5.

In FIG. 2, we saw that the instruction corresponding to the parent node 1 of the processed tree was loaded into the block N24. This block sends a task request N1 (step 50) to the control unit 22. Control unit 22 then searches for an available processor to process the instruction, starting with processor 0 (step 52), and then determines whether processor 1 can deal with the processing (step 4) when the processor 0 is not available and finally checks whether processor 2 is available (step 56) when neither of the two previous processors is available. When no processor is available, a new search for a processor is run.

After one of the processors has performed the processing of the instruction associated with the parent (step 57), the result provided by the processor is the selection between the left branch L or the right branch R that grow from the parent node (step 58). When the processor has selected the left branch, a bit is set to 0 at a position that corresponds to the node of an identification register (step 60), as shown in FIG. 5. Then, the content of the main register N2 is moved to the intermediary register 48 (step 62) and a subtask is sent to the control unit 22.

Similarly, if the right branch was selected after processing the instruction, a bit is set to 1 in the identification register (step 64). The content of the register N3 is moved into the intermediary register (step 66) and a subtask request is sent to the control unit 22. Whichever selection is made by the processor for the left or the right branch, the subtree register block is available after the content of the register N2 or N3 has been loaded into the intermediary register and after the subtask request has been sent. Therefore, the subtree register block is released (step 68) and the instructions associated with another subtree can be loaded into this block. The continuation of the processing for child nodes is shown in FIG. 4. After the subtask request has been sent to the control unit 22 (step 70), the instruction associated with one of the child nodes (N2 or N3) is immediately processed (step 72) by the processor that processed the parent node and was not released. Consequently, an advantage of this embodiment is to have the instructions stemmed from a single block of subtree registers processed by the same processor.

As previously, the processing performed by the processor determines the selection of the left or right branch (step 74). If the left branch is selected, a bit is set to 0 in the identification register associated with the subtree processed (step 76), as shown in FIG. 5. If the right branch is selected, a bit is set to 1 in the identification register (step 78).

After the identification register has been set, the processor is released (step 80) as there are no more registers in the subtree register block. Clearly, the processor would not be released if the instructions associated with grandchildren were also loaded in the subtree register block. Next, a determination is made as to whether the subtree just processed is part of the tree branch sequence between the root and the leaf matching the search key and whether it is to be killed or not (step 82). If the subtree is not part of this branch sequence, it is killed (step 84) and a new subtree determined according to appropriate criteria is loaded into the subtree register block (step 86). On the other hand, if it is determined that the subtree is part of the branch sequence that matches the search key, a determination is made as to whether or not this subtree was already the master subtree starting at the root (step 88). If not, it is combined with the former master subtree and this combination replaces the former master subtree (step 90). In both cases, the subtree register block is loaded with the instructions associated with the subtree that corresponds to the branches of the last node of the subtree just processed (step 92).

Figure 5:
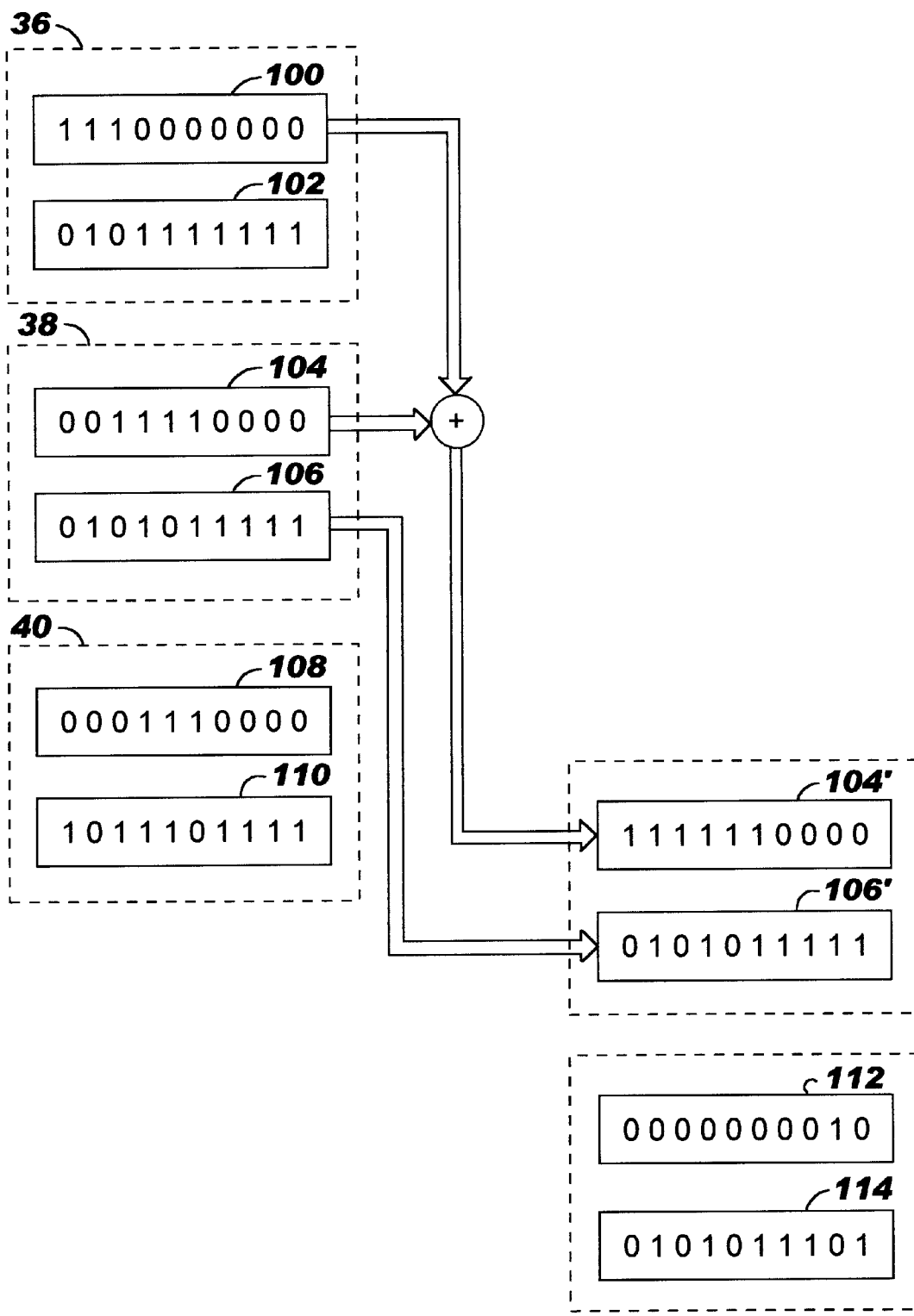
FIG. 5 schematically represents the contents of the identification register blocks and the mechanism used to determine a new master subtree.

The identification register blocks shown in FIG. 5 comprise two registers: one position register and one value register. An identification register block must respond to each programmable module processor running the instructions associated with a subtree. Thus, assuming that three subtrees, one of which starts from root, are being processed by the processors 30, 32,34, three identification register block are associated with these processes: the block 36, which is associated with the subtree that starts from the root and which is referred to as master, and two other blocks 38 and 40 respectively, which are associated with two subtrees selected according to appropriate criteria.

The position register of each block includes bits set to 1 at any position corresponding to nodes that have been processed by the associated processor. Thus, the position register 100 within block 36 (FIG. 5) has three bits set to 1 at the three first positions. This means that the subtree whose nodes are already processed is a master subtree made up of the root (the left bit is set to 1) of a child and a grandchild. The bits of the value register 102 from the same block that correspond to processed position bits are set to 0 or 1 depending on the branch selected. Thus, the first bit set to 0 means that the subtree includes the left branch from the root. The second bit set to 1 means that the next branch from the root's child is the right branch. The third bit set to 0 means that the third branch from the child is the left branch. Bits of the value register that correspond to positions not processed (set to 0) remain set to 1 (but they could be set to 0). The previous flow charts show that steps 60 (FIG. 3) and step 76 (FIG. 4) consist of setting the position bit to 1 and the corresponding value bit to 0 if the position is processed, while this same value bit is set to 1 in steps 64 (FIG. 3) and 78 (FIG. 4).

The subtree associated with the identification register block 38 starts at a node that corresponds to a third level, or grandchild, from the root of the binary tree, since the two first bits of the position register 104 are set to 0 and the four next bits are set to 1, which means that the subtree has four nodes processed.

The subtree associated with the identification register block 40 starts at a node that corresponds to a fourth level, or great-grandchild, from the root of the binary tree, since the three-first bits of the position register 108 of the block are set to 0. As the three next bits are set to 1, this means that the subtree has three nodes processed.

The values of the bits preceding the positions to be processed are known, as they result from branch positions (left or right) to be taken from the root in order to reach the first position to be processed.

Figure 4:
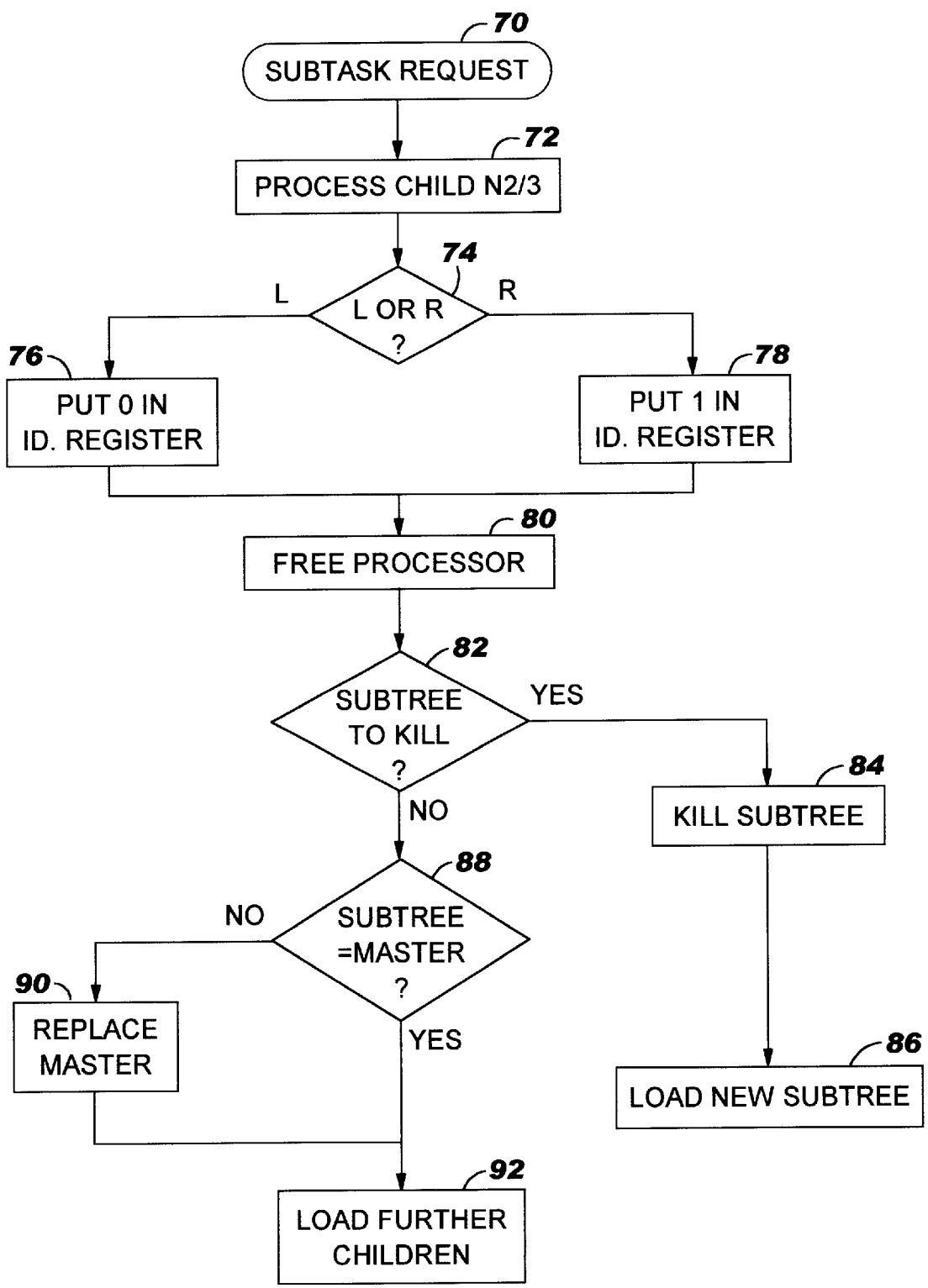
FIG. 4 is a flow chart giving the steps used to process the function associated with a child node of a subtree.

When the processed subtree is not the master subtree, as is the case of subtrees associated with identification register blocks 38 and 40, the bits of the value register with corresponding bits set to 0 up to the first bit set to 1 in the position register, are compared to the same value bits of the block corresponding to the master subtree, so that steps 82 to 92 of FIG. 4 can be performed. Thus, the two first bits of the value register 106 from block 38 are identical to the two first value bits of the value register 102 from block 36, which means that the subtree associated with the block 38 is connected to the master subtree associated with the block 36. The subtree is thus to be kept (N0 from step 82, FIG. 4) and, since it is not the master subtree (N0 from step 88, FIG. 4), it must replace the master subtree (step 90, FIG. 4).

On the other hand, in the case of the subtree associated with the block 40, the first bits of the value register 110 are not identical to the corresponding bits of the value register 102 associated with the master subtree. This means that the considered subtree is not connectable and, therefore, does not belong to the branch sequence of the binary tree defined according to the search key. Consequently, this subtree may be killed (step 84, FIG. 4).

When a subtree is connected to the master subtree and is bound to replace it, as is the case for the subtree associated with the block 38, the value register 106' remains identical to the previous value register 106. On the other hand, the value portion 104' has been changed compared with the position register 104 by performing a logical OR between the bits of the position register 104 associated with the subtree considered and the bits of the position register 100 associated with the master subtree. The result of this operation should be the presence of a number of consecutive bits set to 1 from the left in the position register, followed by a sequence of bits set to 0 in the right part of the register. The presence of a bit set to 0 among the bits set to 1 would indicate that the subtree is not necessarily connectable to the master subtree. Once the master subtree has been replaced with the subtree associated with the block 38, the processing of the child of this subtree can be continued by loading a connectable subtree into one of the two released identification register blocks (step 92, FIG. 4).

Finally, a subtree can be started (step 88, FIG. 4) by using the block 40, whose associated subtree has been killed. As shown in FIG. 5, this new subtree must be part of the possible sequence of the next master subtree but must start downstream since the processing of the master subtree is being continued. Thus, the first bit set to 1 in the position register 112' is the ninth bit and the first six bits in the value register 114' are identical to the first six bits already processed of the value register of the new master subtree.

The following examples illustrate the invention in a practical way. The first example, illustrated in FIG. 6, relates to a binary tree whose leaves represent the next hops (routes) to be used for a number of prefixes. Couples made up of the prefix and the route are the entries of the following Routing table:

|      |          |
| ---- | -------- |
| 1    | Route RT1 |
| 0    | Route RT2 |
| 11   | Route RT3 |
| 101  | Route RT4 |
| 1010 | Route RT5 |
| 100  | Route RT6 |
| Others | Route RT0 |

Figure 6:
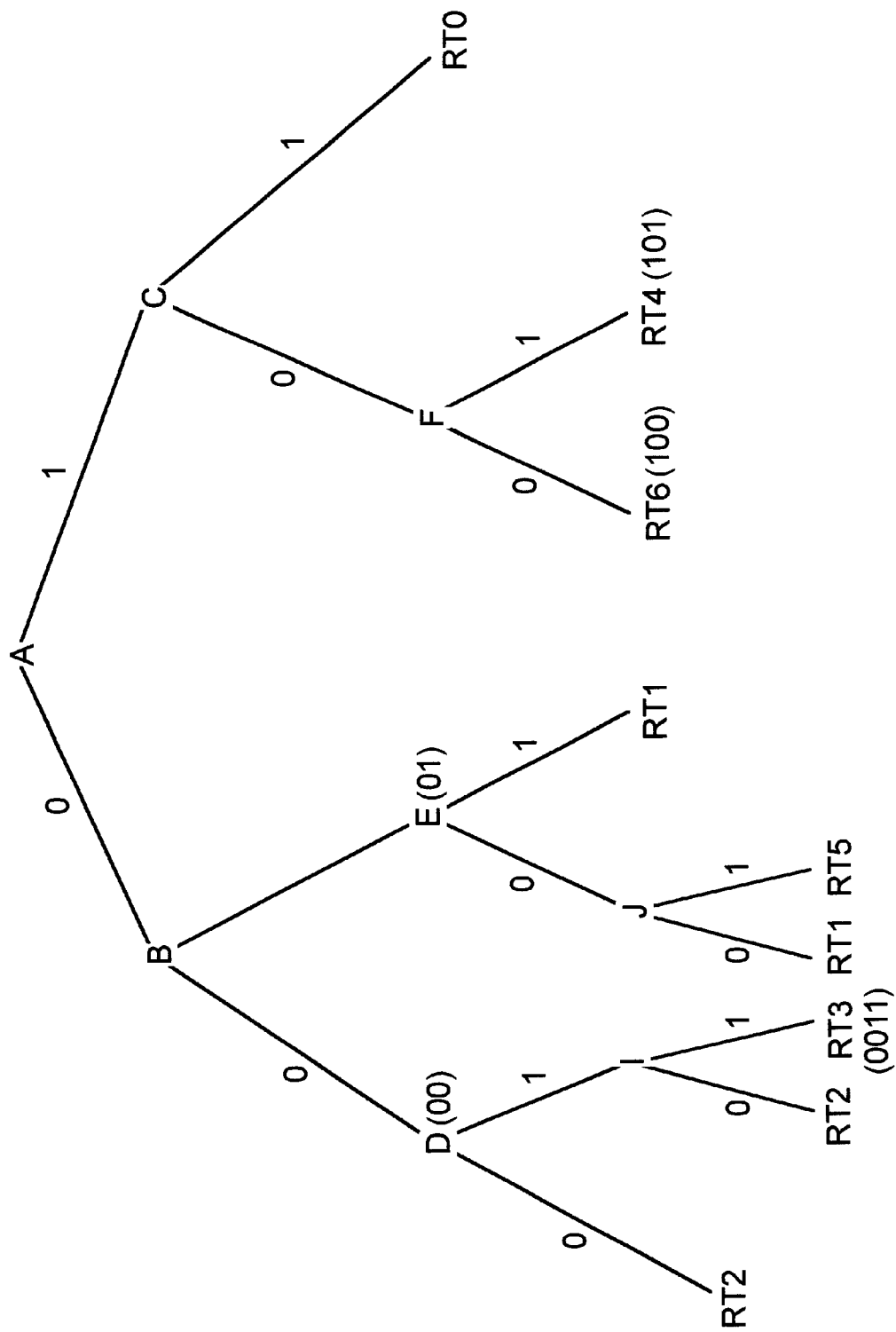
FIG. 6 is a binary tree representing the longest matching prefix search implementing the device according to the invention when the function associated with the nodes is a simple comparison.

In that case, the search key is a destination address determined by the router and the search consists of determining the longest prefix matching this destination address by using the binary tree of FIG. 6. Here, the recursive function is reduced to a simple comparison to determine the left branch (0) or the right branch (1) from the node, that is a Boolean function ET between 1 and the next bit of the search key.

Assuming that the IP destination address begins with the byte 01010000, the longest matching prefix that will be determined at the end of the processing is 01010, which corresponds to the RT5 route. As an example for illustrating the implementation of the invention, three subtrees are processed in parallel by the processors 30, 32, and 34, FIG. 1. These are the subtree starting at the root A, the subtree starting at D and the subtree starting at E.

The processing of the first subtree starting at A performed by using the device shown in FIGS. 1 and 2 is carried out over the subtree including nodes A, B, E according to the two first bits 01 of the search key. The processing of the second subtree starting at D leads to the leaf pointing to RT2 according to the third bit set to 0 in the search key. After processing, the third subtree starting at E is made up of the branch that goes E to J and of the branch that leads to RT5 leaf, according to the third and fourth bits of the search key.

By using the method just described, the device kills the second subtree since it is not connected to the master subtree starting at the root. On the other hand, the third subtree that connects the master subtree becomes the master subtree and makes it possible to determine the sequence of branches to be taken within the binary tree of FIG. 6 in order to lead to the leaf pointing to the route to be used.

Again in the process of searching for the longest useful prefix in order to know the routing address to be used when a destination address used as a search key is known, the following example illustrates the case when the recursive function applied to each node is not only a bit comparison but a 32-bit instruction used in the framework of the description of U.S. patent application Ser. No. 6,341,346 filed by the Applicant which is hereby incorporated herein by reference.

Figure 7:
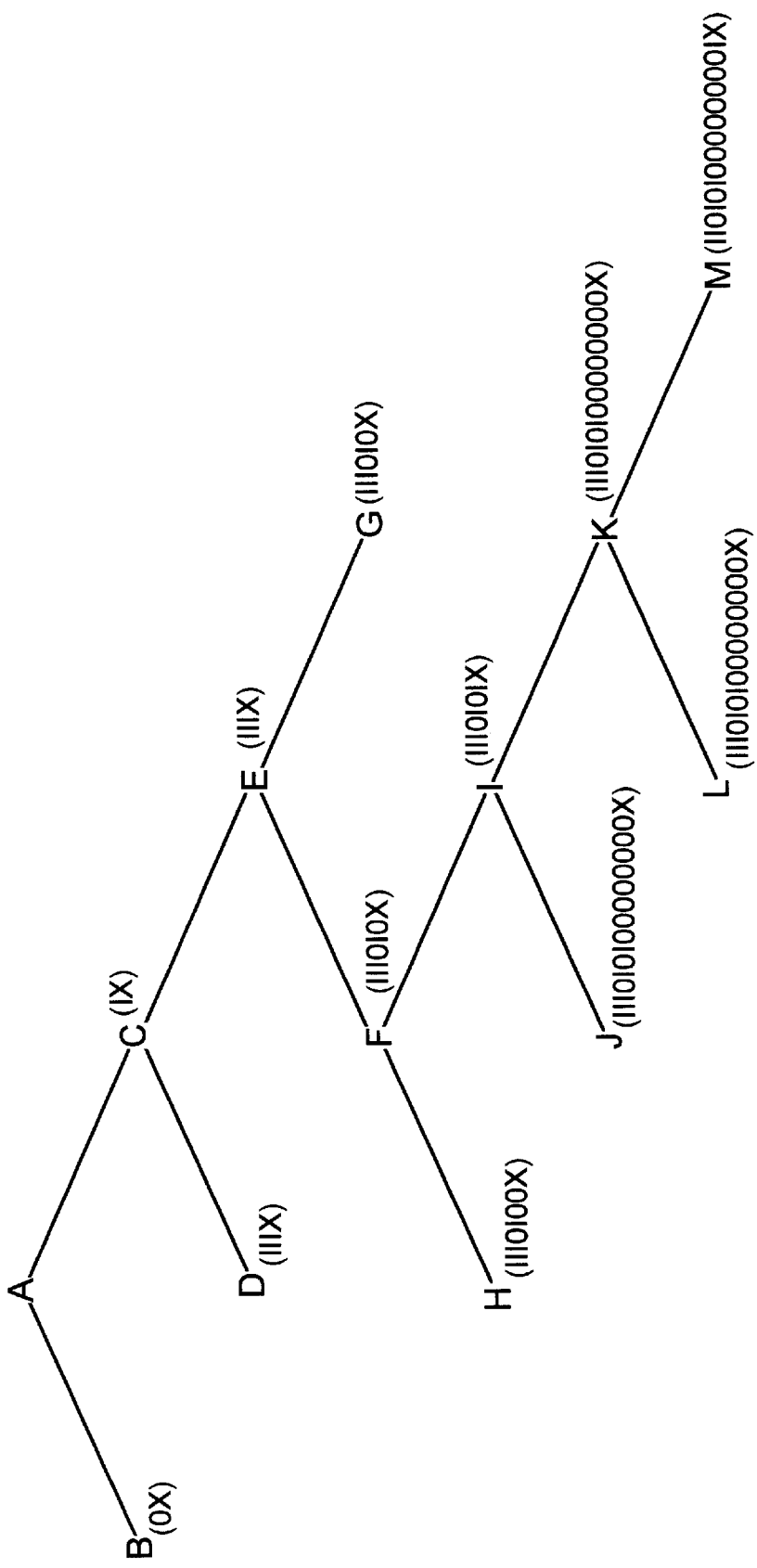
FIG. 7 is a binary tree representing the longest matching prefix search implementing the device according to the invention when the function associated with the nodes is a function with specified parameters.

In that case, the processing performed by the processors of the device according to the invention makes it possible to determine one or several bits when going from a parent node to a child node. Assuming that the search key is the address made up of the two first bytes 111010100 and 00000001, the corresponding binary tree in which only the useful nodes have been represented is shown in FIG. 7. The association of these nodes by the figure with their respective keys shows that the number of bits required to go from a level to another level is variable according to the following table:

From root to 1st level→1 bit
From 1st level to 2nd level→2 bits
From 2nd level to 3rd level→3 bits
From 3rd level to 4th level→1 bits
From 4th level to 5th level→8 bits
From 5th level to 6th level→1 bit By using the device according to the invention described with reference to FIG. 1 and FIG. 2, three subtrees can be processed concurrently with the three processors of the device. Therefore, it is possible to process simultaneously a first subtree starting at the root A, a second subtree starting at the root E and a third subtree starting at the root I. The instructions to be processed are as follows:

| Subtree | Node | Instruction |
| --- | --- | --- |
| First | A | $00010011B_{10}\ldots B_001C_{10}\ldots C_0$ |
|  | B | $01101101E_{10}\ldots E_011D_{10}\ldots D_0$ |
| Second | C | $10001001F_{10}\ldots F_011G_{10}\ldots G_0$ |
|  | D | $00010011H_{10}\ldots H_001I_{10}\ldots I_0$ |
| Third | I | $01011101K_{10}\ldots K_011J_{10}\ldots J_0$ |
|  | K | $00010011L_{10}\ldots L_001M_{10}\ldots M_0$ |

In the instruction fields, $C_{10}\ldots C_0$, $E_{10}\ldots E_0$, $F_{10}\ldots F_0$, $I_{10}\ldots I_0$, $K_{10}\ldots K_0$ represent address fields of the next node as they are preceded by 01 indicating a memory address field in the same page while $B_{10}\ldots B_0$, $D_{10}\ldots D_0$, $G_{10}\ldots G_0$, $H_{10}\ldots H_0$, $J_{10}\ldots J_0$, $L_{10}\ldots L_0$, $M_0\ldots M_0$ provide pointers to routing information as they are preceded by 11 indicating a pointer field.

According to the principles set forth in the above description with reference to FIG. 6, the device according to the invention determines that the second subtree connects the first or master subtree and that the third subtree connects the new master subtree made up of the combination of the two first subtrees, to form a subtree made of the juxtaposition of all branches that extend from the root to the leaf (M node) according to the search key. In the example above, the processing can thus be reduced to the time required to run two instructions for performing a search for a 16-bit key, compared to the time required to run six instructions when the device according to the invention is not used. Therefore, the benefit provided by the device according to the invention can be clearly perceived for data transmission over high-speed IP networks, since the overall process can be speeded up by a factor of three.

Of course, the performance of the device according to the invention depends on the selection of subtrees to be processed in parallel so that subtrees bound to be not used not be processed. The selection of subtrees to be processed can thus be made according to two criteria. The first criterion is a selection based only on a comparison of binary values having a given level on which the starting of a look-ahead search is wanted: for example, the youngest great-grandchildren (having the smallest binary value). Depending on the number of parallel processing runs, their descendants will then be processed over one or several levels, knowing that the overall algorithm will kill some processing runs as soon as it detects that they are not on the proper path, and enable some other supposed to be more successful. The second criterion is a selection based on past use, in which the paths taken most often during previous sorting operations are enabled.

Figure 8:
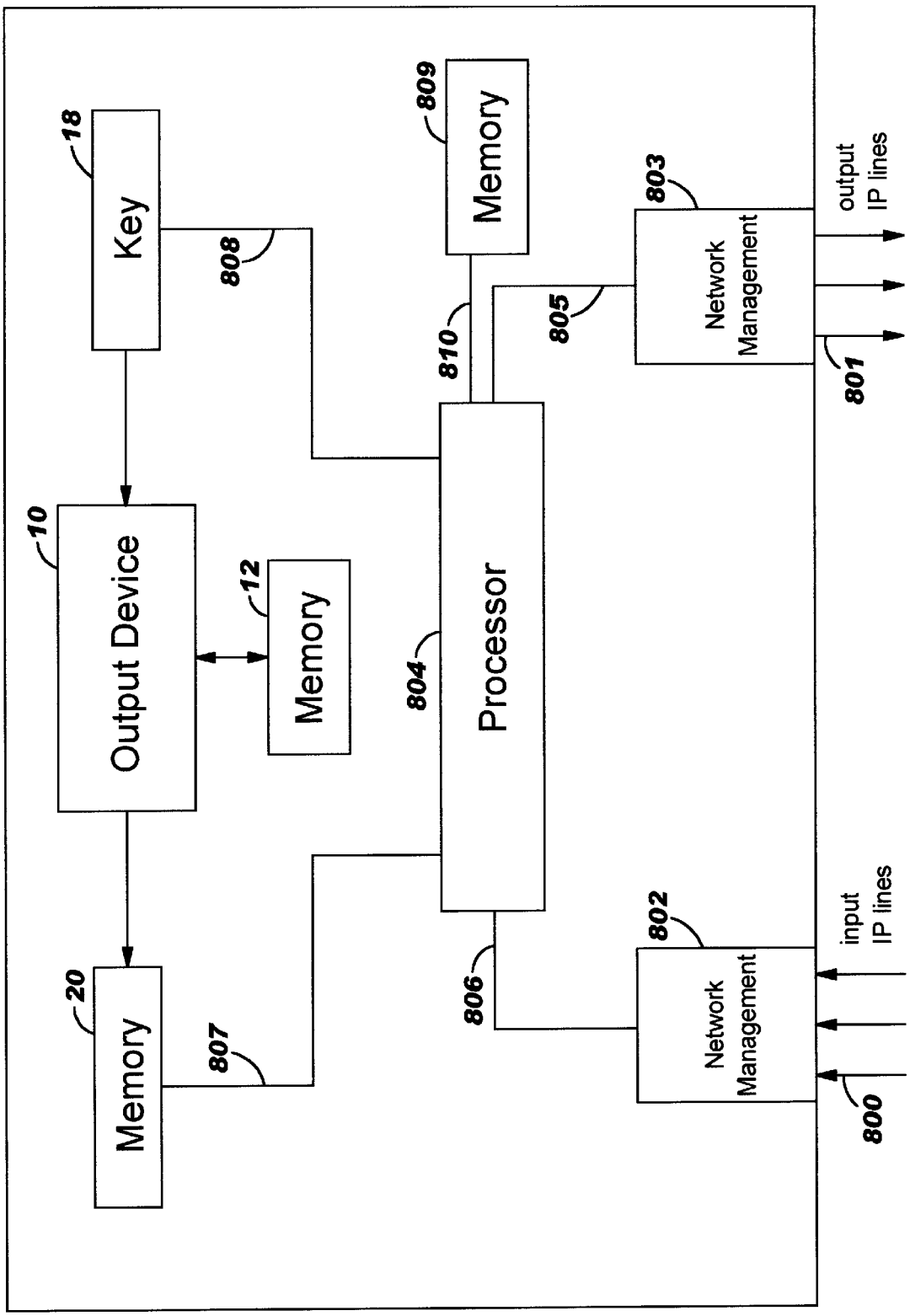
FIG. 8 shows an IP router implementing the device of the preferred embodiment.

As illustrated in FIG. 8, an efficient IP router implementing the device of the preferred embodiment (10) comprises network attachments (802 and 803) to respectively input IP lines (800) and output IP lines (801) of an IP network. A processor (804) reads from the input network attachment, through an internal bus (806), the destination address which is stored in the header of an IP datagram arriving on the input network lines. The destination address is saved by the same processor as a chain bit key in a first unit (18), preferably a register, accessed by the device of the preferred embodiments using an internal bus (808). The device of the preferred embodiment accesses a second memory unit (12) where is stored the binary tree in the form of instructions. The output of the device (10) is the searched tree leaf, preferably an address pointer. It is stored by the device in a third memory unit (20), preferably a register. The processor (804) reads the device output pointer and reads in a fourth memory unit (809) accessed through an internal bus (810) the value of the tree leaf corresponding to the pointer. This value represents the routing address to which the datagram needs to be sent. The processor (804) substitutes in the datagram header the tree leaf value to the destination address and sends the modified datagram on the output line (801) through the network attachment (803), using the internal bus (805). The second and third memory units form the 'routing table' of the IP router.

Although the present invention and its advantages have been described in detail, it should be understood that various changes, substitutions and alterations can be made herein without departing from the spirit and scope of the invention as defined in the appended claims. For instance, the possible arrangements for the memory units is well known by those skilled in the art and can consist of different physical memory units or can be merged in one memory unit.

What is claimed is:
1. A device for parallel processing of subtrees within a binary tree, suitable for searching for the tree leaf matching a search key, said binary tree having a pyramidal structure starting from a root node and being made up of a plurality of nodes linked by branches in which each node is associated with a group of node keys and which can have, at most, two child nodes linked to a parent node by means of a left branch and a right branch, the searching being performed at each node by applying a recursive function associated with each node whose parameters depend on said node for determining which branch, left or right, is to be taken in accordance with the search key; said device comprising:
   a plurality of subtree register blocks for storing the recursive functions associated with the nodes of a subtree within said binary tree;
   a plurality of processors at least equal in number to the number of said plurality of blocks for processing the recursive functions stored in said subtree register blocks;
   a control unit that assigns one processor among said plurality of processors to the task of processing the recursive functions contained, among said plurality of blocks, in a block that sent a request to said control unit; and
   means for selecting subtrees included in a sequence of branches between the root and said tree leaf matching said search key in response to the processing of blocks from said plurality of blocks.

2. A device according to claim 1, wherein said processors are identically capable of processing the recursive function associated with any node from said binary tree, each of said processors being selected in turn when available and on the request of said control unit for processing the recursive functions.

3. A device according to claim 2, wherein each of said subtree register blocks includes a parent main register for storing the recursive function associated with the corresponding subtree start node, and two child main registers for storing the recursive functions respectively associated with the two child nodes of said start node.

4. A device according to claim 3, wherein each said subtree register block further includes an intermediary register for storing the recursive function of one of the two child nodes which was stored into one of said child main registers and the selection of which results from the processing of the recursive function associated with the parent node by a processor of said plurality of processors, the processing of the recursive function associated with said selected child node being performed by said processor that performed the processing of the recursive function associated with said parent node.

5. A device according to claim 4, wherein said means for selecting subtrees included into the sequence of branches between the root and said leaf include a plurality of identification register blocks, each of said identification register blocks being associated with a subtree the nodes of which have their recursive function being processed by said processors and including a position register in which the position of each bit corresponds to the position of a node of said subtree within said binary tree, and a value register in which each bit is equal to 0 or 1 depending on whether the branch selected from the node defined by the corresponding bit in said position register is the left branch or the right branch.

6. A device according to claim 5, wherein the number of said plurality of identification register blocks is equal to said plurality of processors.

7. A device according to claim 6, wherein said position register initially includes a sequence of bits equal to 0, each bit from the bit whose position corresponds to the parent node of said subtree whose nodes have their recursive functions being processed, being set to 1 when the recursive function associated with the corresponding node is operating.

8. A device according to claim 7, wherein one of said identification register blocks is associated with the master subtree whose parent node is the root, the position register of said identification register block having at least its first bit set to 1.

9. A device according to claim 8, wherein one of said identification register blocks becomes newly associated with the master subtree when a first and a second condition are satisfied, wherein the first condition is that, in the newly associated block, the sequence of first bits of the value register whose positions match the positions of bits set to 1 in the position register of a block formerly associated with the master subtree, is identical to the sequence of bits having the same position in the value register of said formerly associated block, and wherein the second condition is that the result of a logical OR applied to the contents of position registers of said formerly associated block and said newly associated block, is a sequence of bits set to 1 from the first bit, the content of the position register of said newly associated block being replaced with said sequence of bits set to 1 resulting from said logical OR.

10. A device according to claim 9, wherein said control unit is a finite-state machine.

11. A device according to claim 10, wherein said recursive function associated with each node of said binary tree is a comparison corresponding to a logical function AND between 1 and the last bit of the key associated with said node for determining whether the branch to be selected from said node is the left branch or the right branch.

12. A device according to claim 10, wherein said recursive function associated with each node of said binary tree is an instruction whose parameters are different for each node, and whose processing makes it possible to determine one or several bits of the key associated with the child node located at the end of the branch that was selected from the parent node.

13. A router within an IP network comprising:

attachment to at least one input and at least one output IP network lines;

a processor for reading a destination address in the header of an IP datagram arriving on one of said at least one input IP line and storing the destination address as a search key in a first memory unit;

a second memory unit for storing a binary tree formed of recursive functions, one recursive function for each node of the binary tree;

a device for parallel processing of subtrees within the binary tree for searching for a tree leaf matching the search key, said binary tree having a pyramidal structure starting from a root node and being made up of a plurality of nodes linked by branches in which each node is associated with a group of node keys and which can have, at most, two child nodes linked to a parent node by means of a left branch and a right branch, the searching being performed at each node by applying a recursive function associated with each node whose parameters depend on said node for determining which branch, left or right, is to be taken in accordance with the search key; said device comprising:

a plurality of subtree register blocks for storing the recursive functions associated with the nodes of a subtree within said binary tree, a plurality of processors at least equal in number to the number of said plurality of blocks for processing the recursive functions stored in said subtree register blocks, a control unit that assigns one processor among said plurality of processors to the task of processing the recursive functions contained, among said plurality of blocks, in a block that sent a request to said control unit, and means for selecting subtrees included in a sequence of branches between the root and said tree leaf matching said search key in response to the processing of blocks from said plurality of blocks;

a third memory unit used by the device to store the matching tree leaf; and a fourth memory unit for storing the content of each tree leaf;

wherein the processor reads the content of the matching tree leaf stored by the device in the third memory unit, substitutes the content of the matching tree leaf for the destination address in the datagram, and then sends the datagram to one of the at least one IP output line.

* * * * *